Figure 1:
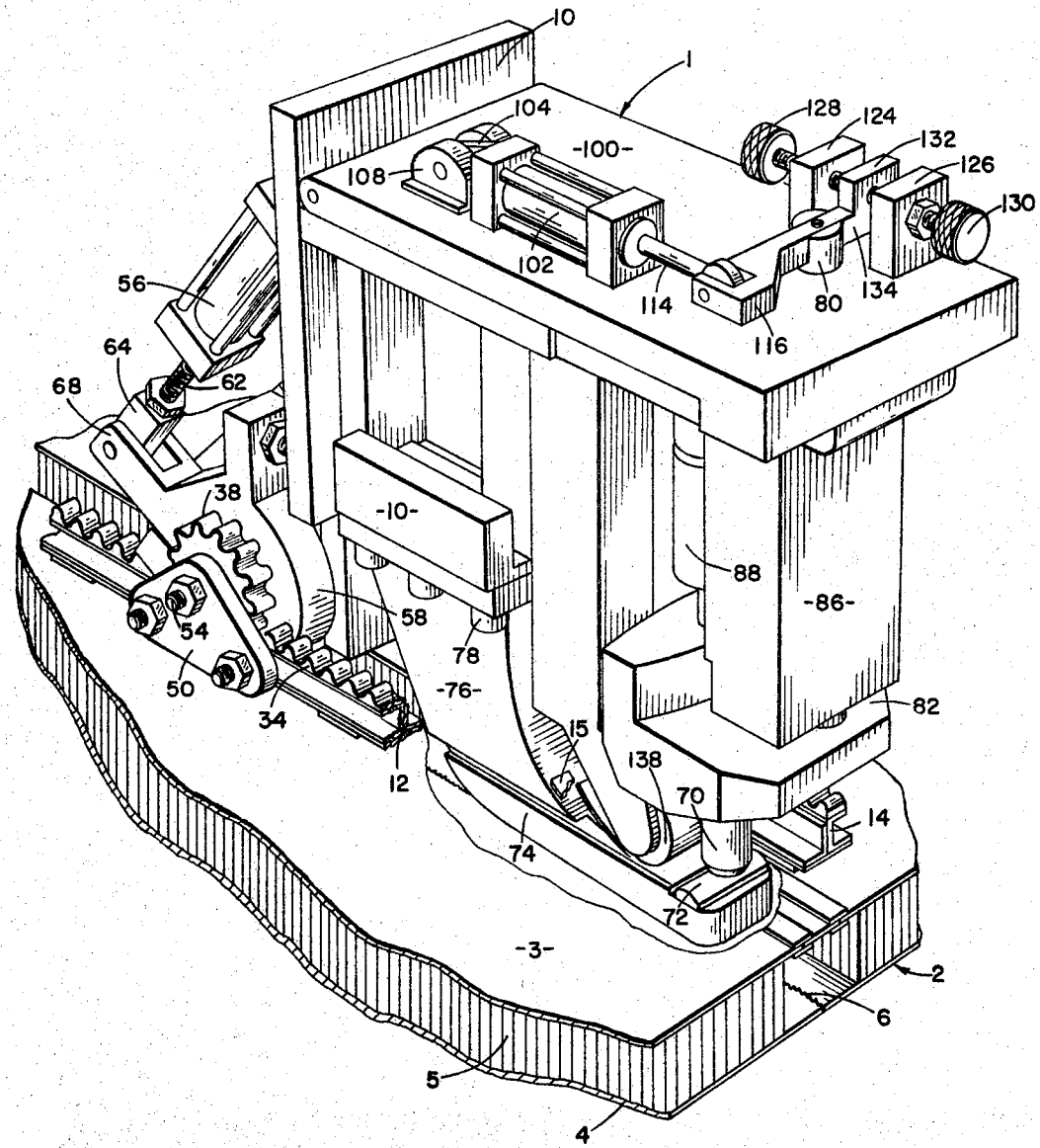

Aug. 9, 1966

J. O. LAWS ETAL 3,265,852

RESISTANCE WELDED JOINT AND APPARATUS
AND METHOD FOR MAKING SAME

Filed Sept. 29, 1961

7 Sheets-Sheet 1

INVENTORS
JAMES O. LAWS, HAROLD W. BLOOM
HOWARD C. GILLEN, JAMES B. HAMILTON
BY ROCCO P. ROBELOTTO, EARL R. DUMAS
RODERICK G. ROHRBERG

ATTORNEY

INVENTORS
JAMES O. LAWS, HAROLD W. BLOOM
HOWARD C. GILLEN, JAMES B. HAMILTON
BY ROCCO P. ROBELOTTO, EARL R. DUMAS
RODERICK G. ROHRBERG

ATTORNEY

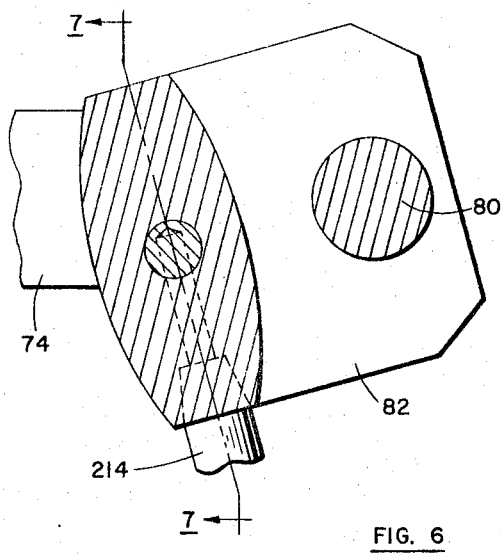
FIG. 6
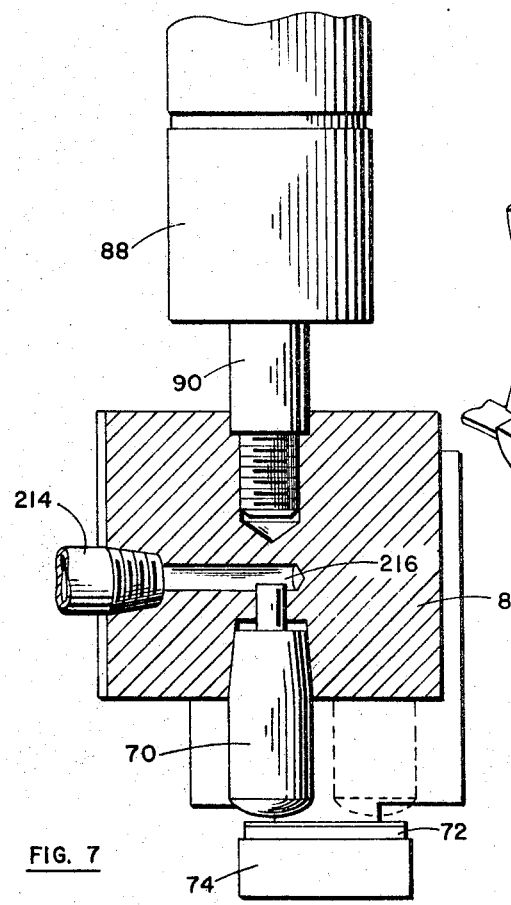
FIG. 7
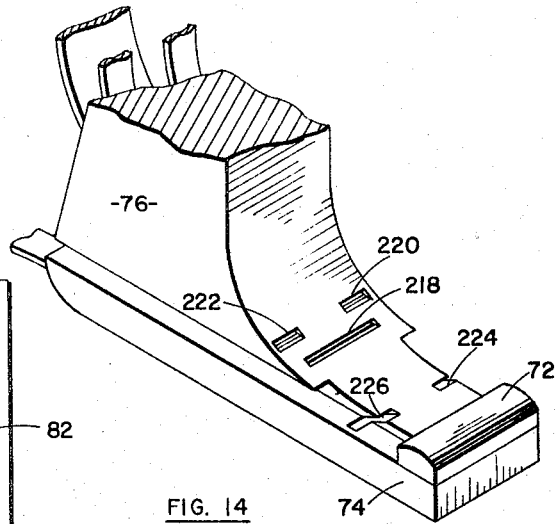
FIG. 14
*INVENTORS*
JAMES O. LAWS , HAROLD W. BLOOM
HOWARD C. GILLEN , JAMES B. HAMILTON
BY ROCCO P. ROBELOTTO, EARL R. DUMAS
RODERICK G. ROHRBERG
ATTORNEY

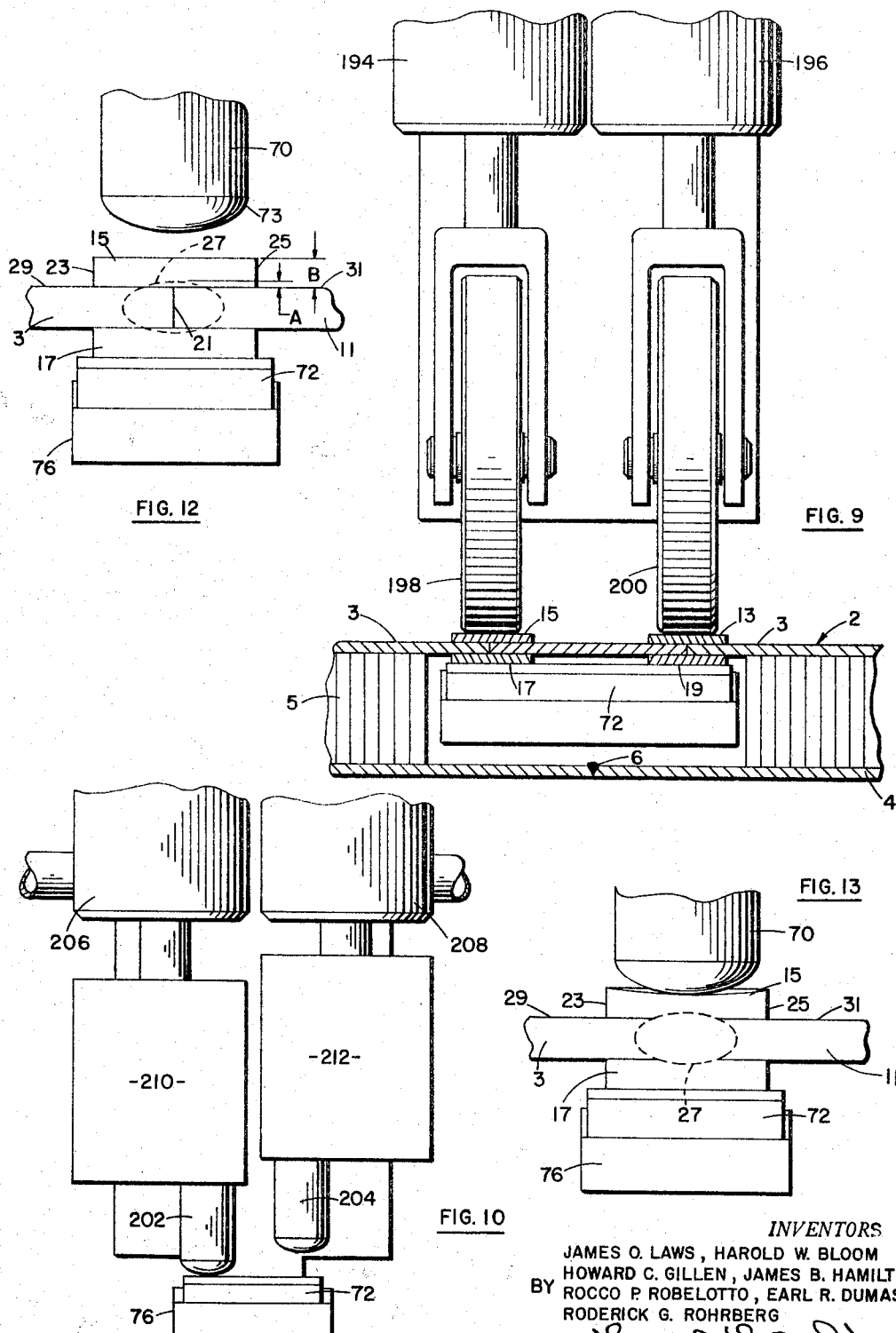

United States Patent Office 3,265,852
Patented August 9, 1966

3,265,852
RESISTANCE WELDED JOINT AND APPARATUS AND METHOD FOR MAKING SAME
James O. Laws, Hermosa Beach, Harold W. Bloom, Torrance, Howard C. Gillen, Inglewood, James B. Hamilton, Redondo Beach, Rocco P. Robelotto, Canoga Park, Earl R. Dumas, Lancaster, and Roderick G. Rohrberg, Inglewood, Calif., assignors to North American Aviation, Inc.
Filed Sept. 29, 1961, Ser. No. 141,804
46 Claims. (Cl. 219—80)

This invention concerns an improved type of resistance welded joint as well as method and apparatus for forming such joints. More particularly, this invention concerns resistance welding to form a high strength weld joint between workpieces of sheet form, or between members having a relatively thin portion such as a sheet metal flange or the like which is welded to a similar portion. In addition, this invention includes a self-guided and mobile precision welder for performing welding of the type described in joining two workpieces of panel type having a lightweight cellular core affixed between two face sheets.

The invention disclosed herein is applicable to the fabrication of any structure which requires joinder of flange-like portions of the type stated above in abutting relationship. However, a particular need for this invention exists in connection with the fabrication of precipitation hardenable stainless steel sandwich-type panels used for skin surfaces on advanced triple-sonic aerial vehicles and missiles. In making such panels, slabs of honeycomb core material of thin metal foil are accurately cut to produce the necessary variation in core thickness throughout the section, and are thereafter brazed to sheet metal top and bottom panel face sheets having a thickness normally within the range from .007 to .125 inch. Lightweight panels such as described above are used extensively to form the external surfaces of vehicles of the stated type, the separate panel sections being welded together along their adjacent edges to form such surfaces.

Welding of extremely thin gauge sheet metal such as described above presents formidable problems not heretofore encountered in the fabrication of conventional supersonic aircraft. As in welding generally, the puddle temperature is normally raised much higher than the melting point of the base metal, and some of the welding heat permeates the base metal surrounding the weld area. Changes such as expansion and shrinkage of the heat affected area normally result from the welding operation described above, as well as changes in physical properties such as strength and ductility. Moreover, metallurgical effects such as recrystallization and heat treatment occur due to the application of welding heat.

These several effects are particularly emphasized in the case of joining light or thin walled members to each other. This emphasis is partly due to the high rate of thermal conductivity of thin metallic sections, causing welding heat to be generally spread over a wider area which produces greater and more uneven expansion during heating and commensurately irregular shrinkage after welding. Also, such members undergo wider variations in unit stress than do larger, heavier members during heating and therefore required external support to prevent buckling. Such support is normally unnecessary in welding relatively larger workpieces wherein the mass of the workpiece is sufficient to safely absorb the welding heat within the time required to effect fusion of the material.

Inability of the mass to dissipate welding heat in the joinder of thin or light workpieces results in acute residual stress in such workpieces. Residual stress is caused by shrinkage during cooling of molten metal in the area of the weld, and by phase transformation of the granular structure in the base metal beyond the area of the weld. The resultant stresses are generally greater in the case of rapid cooling than in relatively slower cooling, depending partly upon the distribution of workpiece mass and of heat within such mass. Residual stresses usually have a highly deleterious affect upon the strength of the welded article, since loads externally applied to the workpiece must be limited so that the combined stresses of both external and residual type will not exceed the yield or rupture limit of the workpiece material.

Moreover, the welding problem described above is additionally complicated by the fact that new materials and alloys not heretofore known in the manufacture of conventional supersonic vehicles are used in the panel sections referred to above. Illustrative of these materials is the alloy commonly designated PH15–7Mo, comprised of the following components:

| | |
|---|---|
| Carbon | .09 percent maximum. |
| Manganese | 1.00 percent maximum. |
| Phosphorous | .04 percent maximum. |
| Sulphur | .03 percent maximum. |
| Silicon | 1.00 percent maximum. |
| Chromium | 14.00 to 16.00 percent. |
| Nickel | 6.5 to 7.5 percent. |
| Molybdenum | 2.00 to 3.00 percent. |
| Aluminum | .75 to 1.5 percent. |
| Iron | Balance. |

While the stated precipitation hardenable alloys including PH15–7Mo provide great strength at elevated temperatures, such materials are characterized by a great propensity for crack propagation, resulting in an extreme sensitivity to minute notches, cuts or scratches on specimen surfaces or edges.

In known methods of arc welding materials such as described above, strong, clean and accurate welded joints between thin workpiece sections are unobtainable. Notable among the causes of failure is the fact that shrinkage in the zone of fusion and the area adjacent thereto causes high residual stress in consequence of the restraining force exerted by the base metal surrounding the weld area. The weakening and distorting effects of such shrinkage in thin sections are both unavoidable and acute. Therefore, conventional arc welding techniques are unacceptable in the instant problem situation, since accurate fitting of welded components in fabricating vehicles of the stated class is essential, especially where large sections must be joined together along continuous, high-strength weld seams. In order to minimize the shrinkage and other adverse affects of arc welding, resort has been made to resistance welding in joining panels of the stated type, including use of filter strips to supplement the material of the base metal.

However, conventional methods of resistance welding as applied to material described above results in joints having low strength for various reasons including porosity of the weld nugget and the introduction of minute subsurface notches in the base metal adjoining the fusion zone which produces cracking of the welded specimen when external loads are applied thereto. Moreover, resistance type welding requires access to both sides of the joined surfaces in order to apply the necessary compressive force to the members which form the welded joint. In the case of sandwich type panels, access to the inner surface of one face sheet is severely limited if the other face sheet is continuous and intact. Therefore, neither the welding techniques nor apparatus known to the prior art suffice to achieve welding of the type required in the problem situation discussed above.

Accordingly, it is a general object of this invention to provide an improved weld joint between relatively thin members.

It is a further object of this invention to provide an improved resistance weld joint between relatively thin abutting workpiece sections of material characterized by high rates of crack propagation.

It is also an object in this case to provide improved apparatus for accomplishing a resistance welded butt joint as described in the above object.

It is also an object in this case to provide an improved high strength welded connection between adjacent sections of metallic lightweight sandwich type panels.

It is another object of this invention to provide improved apparatus for accomplishing resistance welding followed by cold forging of the welded joint.

It is a further object in this case to provide an improved method for resistance welding of thin metallic members.

It is another object of this invention to provide a method for resistance welding of thin metallic members with edges in abutting relationship using filler material in the form of an external strip overlapping the stated edges and contacting the surfaces of the stated members.

It is an additional object of this invention to provide a method as stated in the foregoing objects in which the quality of the weld is improved by forging the weld nugget after the welding heat has been substantially removed therefrom.

Figures 2, 5:
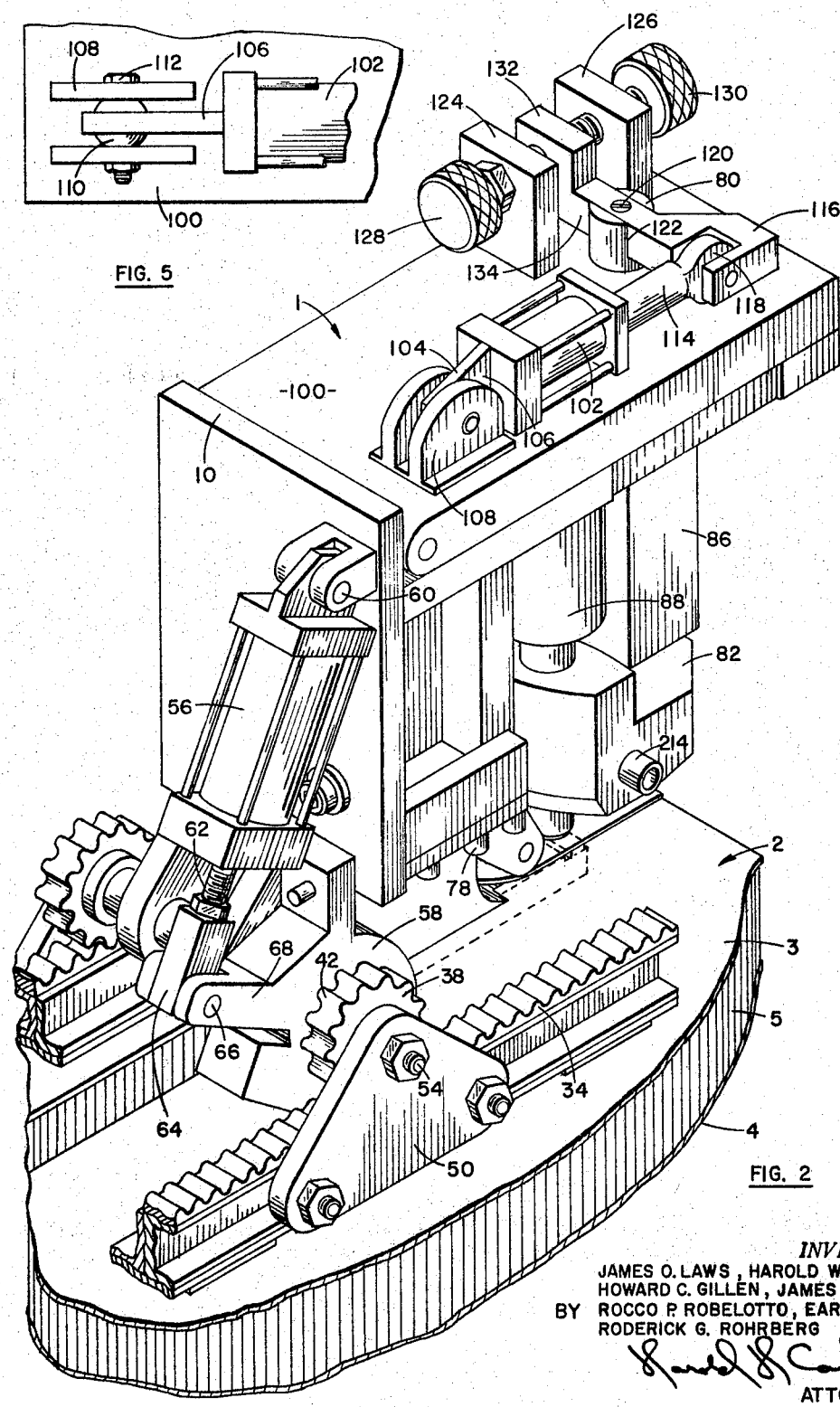
Figure 3:
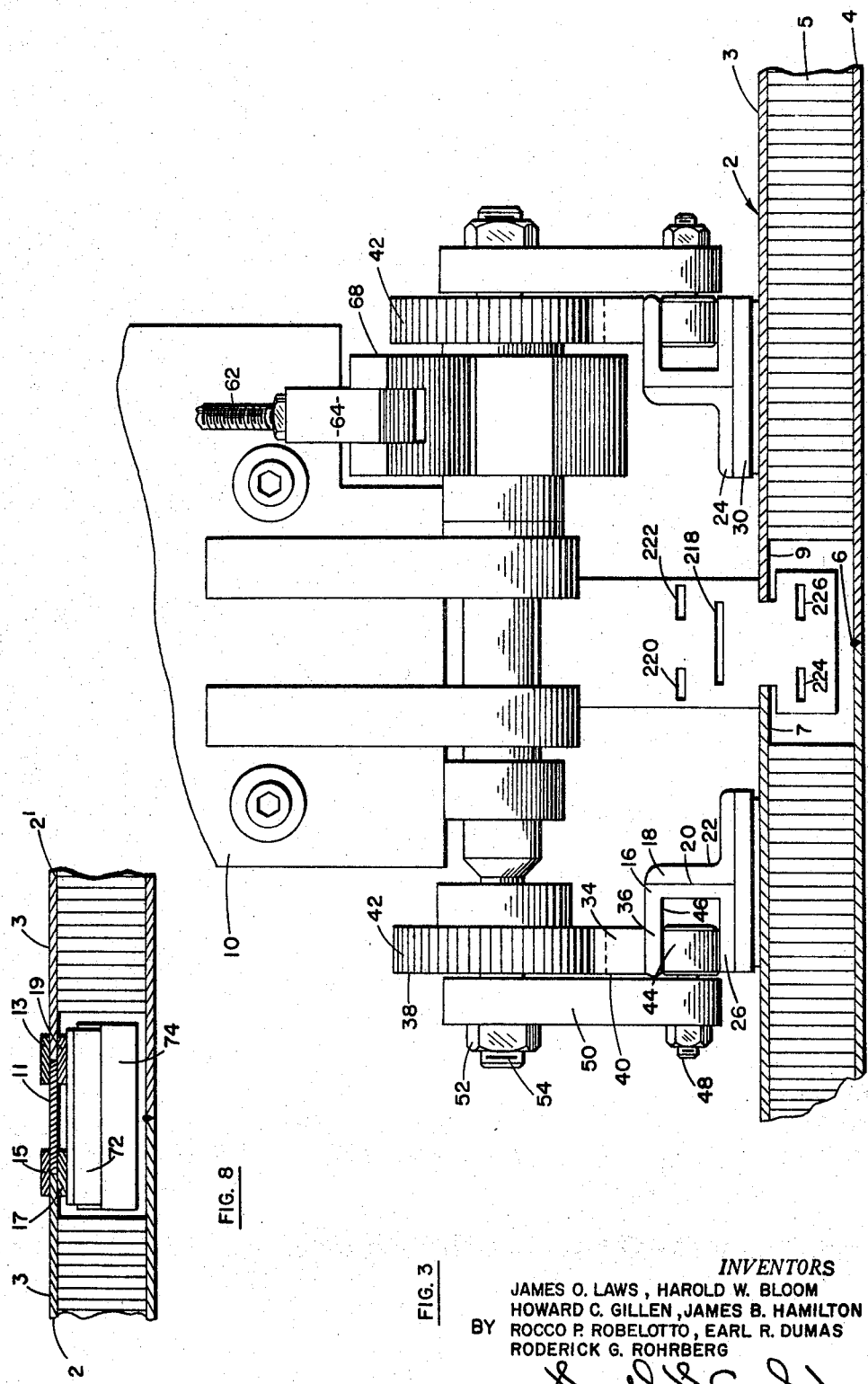
Figure 4:
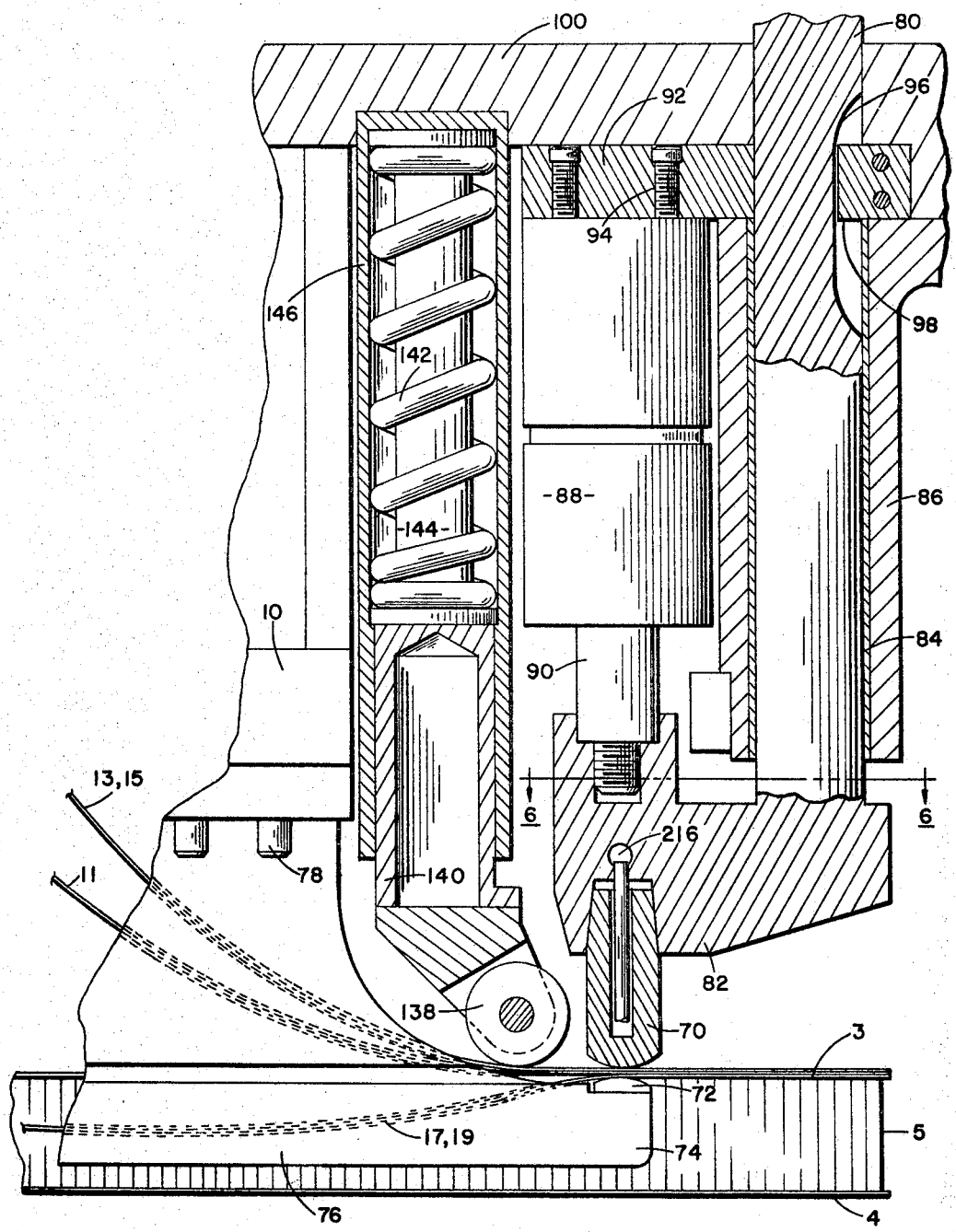
Figure 11:
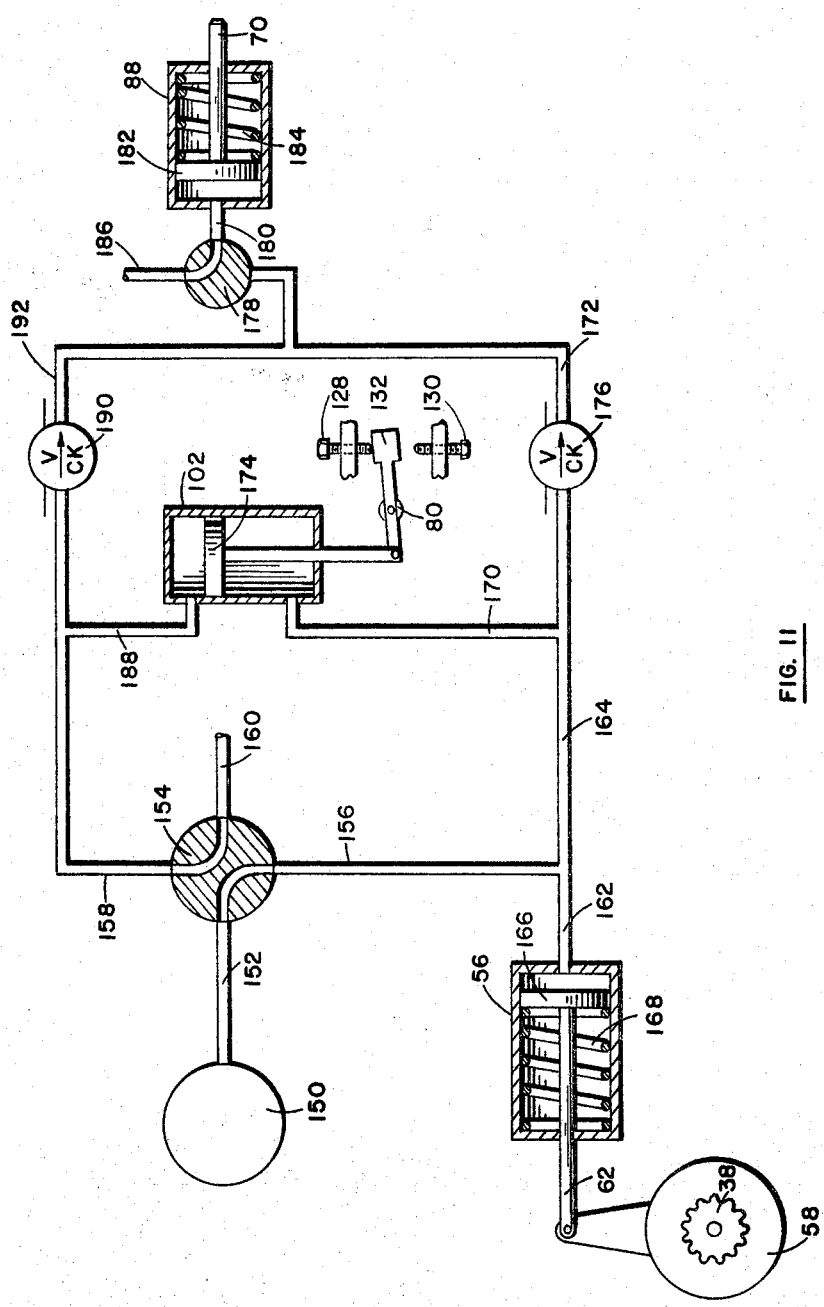

Other objects and advantages will become apparent upon a close reading of the following detailed description of an illustrative embodiment of the inventive concept, reference being had to the accompanying drawings wherein:

FIGURE 1 shows a general perspective view of a preferred embodiment of apparatus for providing a resistance welded joint as disclosed herein, FIGURE 2 shows another general perspective view of the apparatus of FIGURE 1 seen from a different angle, FIGURE 3 shows a fragmentary view in front elevation of the apparatus shown in FIGURES 1 and 2 seen from one end, FIGURE 4 is a fragmentary view partly in vertical cross section taken through the upper electrode of the welding apparatus shown, for example, by FIGURE 1, FIGURE 5 is a plan view of the cylinder used for moving the upper electrode laterally in the embodiment shown by FIGURES 1-4, inclusive, FIGURE 6 is a cross sectional view taken along line 6—6 in FIGURE 4, with portions of structure omitted for the sake of clarity, FIGURE 7 is a cross sectional view taken along line 7—7 shown in FIGURE 6, FIGURE 8 is an isolated view of the weldment shown in FIGURE 3 and which is accomplished by the apparatus of FIGURES 1-7, inclusive, FIGURE 9 shows an alternative embodiment of the upper electrode disclosed by FIGURES 1-7, inclusive, FIGURE 10 is a further illustrative alternative embodiment of the upper electrode structure disclosed in connection with FIGURES 1-7, inclusive, FIGURE 11 is a general schematic view of an illustrative control system which could be used for operation of the welding apparatus disclosed in FIGURES 1-7, inclusive, FIGURE 12 is an endwise view of a single butt joint formed by workpiece components arranged according to the inventive teachings set forth herein, FIGURE 13 is another endwise view of the joint shown by FIGURE 12 during a later stage in fabrication of the joint, and FIGURE 14 is an isolated perspective view of the lower electrode and support therefor from the apparatus of FIGURES 1-7, inclusive.

With reference to FIGURE 12, an illustrative example of a joint formed in accordance with the inventive principles is shown by members 11 and 3 having edges abutting at 21. Members 11 and 3 may be sheets, flanges, strips, or any combination of these. The novel joint further includes a metallic strip 15 arranged in surface contact with members 3 and 11, with edges 23 and 25 of filler strip 15 located substantially equidistantly on either side of the plane of contact 21 as shown. The illustrative example of FIGURE 12 further includes an additional filler strip 17 contacting the surface of members 3 and 11 opposite from that contacted by filler strip 15, but otherwise arranged to overlap equidistantly the plane of abutting contact 21 generally as described for filler strip 15 above. Heat and pressure are applied to the assembled members 3, 11, 15 and 17 arranged in the relationship shown by FIGURE 12 in order to cause fusion of the materials therein resulting in a weld nugget or fusion zone substantially as indicated by dash line 27. The stated heat and pressure may be applied by electrodes such as 70 and 72 shown above and below the assembled workpiece components, respectively, in FIGURE 12.

In accomplishing the welded joint as disclosed herein, it is an important feature of this invention that the weld nugget or zone 27 extends into filler strips 15 and 17 for a portion of the total thickness thereof. Thus, for example, distance A indicated on FIGURE 12 represents the depth of penetration of zone 27 into strip 15, and is substantially less than distance B representing the thickness of strip 15. Distance A may range from 10 to 50 percent of distance B. In actual practice, penetration of the stated zone whereby distance A is within a range from 20 to 30 percent of distance B has been found most convenient. Among its several advantages, penetration of zone 27 into strips 15 and 17 insures that the weld nugget formed between the abutting edges of members 3 and 11 extends completely across the stated edges. Thus, for example, a weld nugget centered between the upper and lower surfaces of members 3 and 11 and joining the abutting edges for only a portion of the base metal thickness at the plane of abutting contact would result in sharp corners remaining on members 3 and 11 where the external surfaces thereof intersect the stated plane. The corners thus formed would considerably weaken the welded joint due to propagation of cracks in the base metal which originate at sharp corners in workpiece materials of the type involved herein when external loads are applied thereto. Moreover, penetration of the zone of fusion partially into filler strip 15, for example, results in some alleviation of shrinkage affects identified with cooling of the weld nugget. Thus, for example, even without application of force externally by electrodes 70 and 72 as discussed below, restraining force is applied to material in the weld zone by filler strip material outside of the zone of fusion during the post weld shrinkage phase.

Moreover, it is also important in practicing the invention disclosed herein that the weld nugget or zone 27 not be so large as to contact or include the line of intersection between side 23 of filler strip 15 and surface 29 of member 3, for example, or the line formed by intersection of side 25 and surface 31 of member 11. Similarly, the weld zone should not include the lines of intersection of the sides of filler strip 17 with the lower surfaces of members 3 and 11. In other words, since zone 27 may be in a molten or semi-liquid state, and is under pressure due to welding force applied by electrodes 70 and 72, any exposure of the nugget to surrounding atmosphere will result in expulsion of molten metal and therefore must be avoided.

As with welding generally, it is characteristic of fusion zone 27 upon cooling to have a slightly different physical structure than the base metal, one feature of which is greater porosity within the stated zone. In order to improve the strength of the welded joint disclosed herein, it has been found beneficial to forge the weld nugget or zone 27 following formation of the same, whereby the porosity of the nugget is substantially reduced and the grain of the weld metal structure is made finer. Moreover, it is an additionally important feature of the invention disclosed herein that the forging is accomplished in sequential relationship with the heating and cooling of the welded joint. Forging is accomplished by appropriate means such as the application of force downwardly by electrode 70 as shown in FIGURE 13 whereby the weld nugget is compressed between electrodes 70 and 72 situated above and below the workpiece components, respectively.

Referring to FIGURE 13, the action of electrodes 70 and 72 in forging weld nugget 27 may be seen to result in a slight reduction in the thickness of the assembled parts, the amount of which varies from a maximum in the central area of the filler strips, the stated area being bisected by the vertical plane 21 containing the center of the weld nugget. The amount of reduction becomes less as each side 23 and 25 of strip 15 is approached, and no reduction in thickness occurs at the stated sides. Thus, the rounded or dome shaped end 73 of electrode 70 shown in FIGURE 12 results in the application of greater compressive force by the electrode about its axial center during the forging action, and no compressive force being applied by electrode 70 at the peripheral portion of end 73. Thus, no forging action occurs at edges 23 and 25 of filler strip 15. Instead of a rounded dome 73 on electrode 70, the electrode tip may alternatively be formed with a substantially flat tip of circular shape having less diameter than electrode 70 and a beveled edge of substantially uniform angle connecting the periphery of the flatted tip with the cylindrical sides of electrode 70. In either case, the tip of electrode 70 is constructed and arranged to apply force primarily through weld nugget 27 to reduce nugget porosity throughout the same, while avoiding the application of such force to the peripheral sides of the filler strip or strips used in forming the welded joint, such as sides 23 and 25 of strip 15.

The reason for avoiding force at or near the sides of the filler strip in the stated manner is to prevent the filler strips from forming grooves or indentations of any type in the surfaces of the members being joined. Thus, for example, if sides 23 and 25 of strip 15 were permitted to form an indentation in surfaces 29 or 31, respectively, during the application of force by electrodes 70 and 72 to forge nugget 27, the creation of an edge in the otherwise planar contour of members 3 and 11 would have a weakening affect on the completed joint due to the resuting sharp discontinuity at which fatigue cracking of the material might begin. Avoidance of such discontinuities is of particular importance in the use of advanced alloy steels such as the workpiece materials mentioned hereinabove and which have a particular sensitivity to abrupt changes in surface contour. This characteristic of the stated materials such as PH15-7Mo steel is known by various terms including crack sensitivity or notch effect, and refers to the crack propagation characteristics of such materials whereby even very minute dents or notches along the edge or surface of a specimen form the potential origin of one or more cracks which quickly appear upon the application of work loads to the specimen, and which propagate rapidly through the specimen. Hardened metals or alloys such as precipitation hardened stainless steels are usually highly crack sensitive, whereas annealed materials usually are not.

It is also an important feature of the inventive concept disclosed herein that forging pressure is applied to weld nugget 27 after the same has been cooled substantially below the welding temperature but preferably while the weld metal is still in a slightly plastic state. The forging pressure thus applied is materially greater than the welding force applied at the time heating is accomplished to effect the resistance weld described above in connection with FIGURE 12, for example. The application of forging force prematurely during the welding process would distort the joint if applied while nugget 27 were at welding temperature. Accordingly, cooling of the fusion zone is accomplished after fusion is complete and while welding force is continously applied in the manner discussed hereinabove. Cooling is extremely rapid, and in the operation of the novel welding apparatus disclosed herein for accomplishing the inventive method under discussion, cooling of the workpiece in the fusion zone occurs at a rate in excess of 1000° F. per second and in fact may approach a rate of 10,000° F. per second depending upon the thickness of workpiece material and the size of the weld nugget in a particular joint.

It will be understood from the teachings set forth above and in the drawings that the weld formed by round electrode 70 is of relatively small area as viewed looking down toward surface 29 and 31 from above the workpiece, with the result that welding heat is applied only to a relatively minute portion of the workpiece total mass. As a result, the adverse metallurgical and stress effects described above in connection with welding generally are largely avoided in the resistance welding method disclosed herein. In further avoiding the stated adverse effects, particularly with regard to post welding shrinkage effects in the workpiece material adjacent the fusion zone, forging of the weld nugget according to the principles set forth above has been found extremely helpful. Thus, the application of forging force causes the compressive stress centered within the weld nugget 27 to apply force which acts generally outward radially in all directions from the center of the nugget in opposition to the direction of restraining forces normally applied to the nugget by base metal in the workpiece beyond the heat affected zone. Accordingly, the forging force tends to counteract the forces resulting from post weld shrinkage, and has been found in actual practice to reduce the amount of such shrinkage quite considerably from that which would occur with known fusion welding methods used on the same test specimens.

The inventive principles discussed above in connection with the method for welding the joint shown by FIGURES 12 and 13, for example, may be used for seam welding along a path to join two strips, sheets or flanges arranged with the distal edges to be joined in abutting relationship throughout their lengths. Thus, for example, after welding is performed in a particular location as shown by FIGURE 13, either the electrodes 70 and 72 may both be moved an equal amount with respect to the stationary workpiece members 3 and 11, or else the two workpiece members may be moved with respect to the relatively stationary electrodes. In either case, the new welding position of electrodes 70 and 72 with respect to members 3 and 11, which may be termed the new welding station, may be any distance away from the position in which the joint shown by FIGURE 13 is accomplished. In actual practice, it has been found advantageous to establish welding stations whereby successive welding by electrodes 70 and 72 will cause the resulting fusion zones to overlap each other. The precise amount of such overlapping may obviously be varied depending upon the welding conditions and material properties in a particular welding problem, and in the case of some materials an overlap of 25 to 50 percent of the area of each preceding weld nugget by the one following has been found to produce seams of maximum strength.

As an illustrative case in the formation of a joint according to the inventive principles disclosed herein, two sheets of PH15-7Mo stainless steel .063 inch thick and abutting in the manner of sheets 3 and 11 shown by FIGURE 12 have been welded using two filler strips arranged in the manner of strips 15 and 17 of .020 inch thickness each.

A force of 700 lbs. total was applied by electrodes 70 and 72 compressing the assembled components together for about one-half a second before the application of welding current, and continuously for an additional .16 seconds during the application of current through electrodes 70 and 72 sufficient to raise the base metal temperature between strips 15 and 17 to about 2700° F. The welding force of 700 lbs. was thereafter continuously applied for .75 second after termination of welding current, during which time cooling of the weld nugget was accomplished to lower the temperature thereof from 2700° F. to a value on the order of 300 to 400° F. During the stated cooling period and after the nugget temperature was reduced below the liquidus, a forging force of 2100 lbs. total was applied to the workpiece on an axis passing through the center of the weld nugget and continuously maintained for a period of approximately .5 second. The resulting joint was found to have a strength materially greater than that obtained from any known type of conventional butt joint weld, particularly as applied to precipitation hardened steel workpieces of the foregoing type.

With reference to FIGURES 3 and 8, an illustrative embodiment of the principles discussed above as applied to joinder of two lightweight sandwich type panels may be seen. The panel connection illustrated represents a new approach to the problem of securing such panels to each other or to other structure having flange or sheet-like portions to which both face sheets of the panel must be joined by strong and secure weldments. As applied to joinder of two panel sections of the type mentioned above to form a single unitary panel, it may be seen from FIGURE 3 that the novel concept involves initially preparing the panel edges to be joined by appropriate cutting to remove a portion of core 5 so that flange-like structure formed by upper and lower face sheets 3 and 4 results. Lower face sheet 4 on each panel is accurately cut to form abutting edges which may contact each other continuously throughout their entire length while upper skin surface 3 on each panel is accurately cut to form confronting edges which are separated by a gap of substantially constant width throughout its length. Lower surfaces 4 while arranged in abutting contact are initially welded to produce a seam or joint 6 shown in FIGURE 3. The welding of seam 6 may be accomplished by a shielded electrode insulated along a portion of its length to prevent electrical contact between the electrode and the surrounding structure, and positioned in welding relationship with respect to workpieces 2 and 2' whereby the electrode extends through the gap formed by the confronting edges of upper face sheets 3 and the welding tip of the electrode performs welding along seam 6.

Upon completion of the joinder of lower face sheets 4 along seam 6 as described above, welding in the final stage of assembly such as required to form the novel connection between panel workpieces 2 and 2' is necessary. Referring to FIGURE 8, it may be seen that the stated gap between upper face sheets 3 is closed by means of a member 11 comprising a closure strip joined at either side thereof in abutting relationship with face sheets 3. Apparatus suitable for performing welding between closure strip 11 and face sheets 3 on either side thereof has not been known to the prior art before the invention disclosed herein, primarily due to the severe size limitation associated with relatively thin panel workpieces making undersurfaces 7 and 9 of upper face sheet 3 almost completely inaccessible after joinder of lower face sheet 4 by seam 6 in the manner discussed above.

As seen from FIGURE 3, for example, closure strip 11 is appropriately sized to fill the gap between confronting face sheets 3 of the panels to be joined, whereby the edges of the closure strip abut the edges of face sheets 3 on either side thereof. Closure strip 11 is welded into position by appropriate means such as apparatus disclosed in detail below and which may accomplish the welding by use of a plurality of filler strips arranged as shown by FIGURE 8, and designated by reference numerals 13, 15, 17 and 19. Filler strips 15 and 17 are positioned above and below the butt joint formed by closure strip 11 and upper face sheet 3 of one panel, while filler strips 13 and 19 are positioned above and below the butt joint formed between closure strip 11 and upper face sheet 3 of the other panel, after which welding heat and pressure are applied by mobile unit 1 as described more particularly hereinabove.

Filler strips 13, 15, 17 and 19 may comprise the same metal or alloy as upper surfaces 3 and filler strip 11. Welding heat is applied in such a manner as to obtain complete penetration of the weld zone through face sheets 3 and closure strip 11 along their abutting edges, but partial penetration into the filler strips positioned above and below the stated edges as discussed above in connection with FIGURES 12 and 13. Also, rapid cooling followed by forging is accomplished all as referred to more particularly hereinabove. Thus, application of the inventive principles pertaining to the joint shown by FIGURE 12, for example, to join panel workpieces has been found to produce superior physical characteristics of the completed panel connection, particularly with regard to the elimination of notch effects, the elimination of shrinkage of materials following the removal of welding heat, and the provision of finer grain weld metal structure than that commonly associated with arc welding processes. Moreover, distortion of the base metal after completion of the welded joint is nonexistent with the resistance welding process described, in contrast to the extreme distortion usually associated with arc welding processes as applied to extremely thin welded structures.

With reference to FIGURES 1 and 2 in particular, an illustrative embodiment of apparatus for performing welding to accomplish the novel joint disclosed herein is shown. The apparatus may be seen to include a mobile welding unit generally designated by reference numeral 1 having a frame or body 10 upon which the various elements subsequently described are mounted.

Mobile welding unit 1 is constructed and arranged to perform welding on one or more workpieces such as designated generally by reference numerals 2 and 2'. Unit 1 is supported for movement relative to stationary workpieces 2 and 2' by suitable means including a plurality of supporting elements 12 and 14 which lie on opposite sides of the welding path and which may take the form of L-shaped channels as shown in FIGURES 1, 2 and 3. Supporting elements 12 and 14 may be identical, hence only one such element may be described in detail. As shown by FIGURE 3, for example, supporting element 12 may be formed by joinder of two beams 16 and 18 along their confronting surfaces as shown at 20 by bolts, welding or other means resulting in an upright portion 22 and a base portion 24 comprising the oppositely facing horizontal flanges 26 and 28 on beams 16 and 18, respectively. The undersurfaces of flanges 26 and 28 may further be joined to a base or platform member 30 by welding or other means to provide additional strength to supporting element 12. Member 30 may be secured to a supporting jig or fixture separate from workpiece 2 or alternatively may be supported on the workpiece surface by appropriate means such as a plurality of suction cups or magnets 32 providing stationary mounting means extending between base member 30 and the surface of workpiece 2. It will be understood by those skilled in the art that supporting elements 12 and 14 may be fabricated by methods other than that described above, such as a single unitary casting or extrusion. Moreover, only one such supporting element may be used instead of two, depending upon the requirements of a given welding problem.

Driving means for causing movement of mobile unit 1 relative to workpiece 2 may be provided in the form of rack 34 welded or otherwise affixed to top portion 36 of member 12. A pinion or driving gear 38 mounted on unit 1 is operatively engaged with rack 34 whereby rotation of the pinion causes a reaction between gear teeth 40 and 42 on rack 34 and pinion 38, respectively, resulting in substantially linear movement of mobile unit 1 with respect to stationary supporting element 12 and workpiece 2. It will be understood that curved supporting tracks may be used in the case of a non-linear welding path, and that movement of unit 1 may be manual instead of motor driven.

Guiding means for guiding the vertical movement of mobile unit 1 relative to workpiece 2 or maintaining constant the distance therebetween are also provided in the form of roller 44 which is operatively related in rolling contact with undersurface 46 of top portion 36 of member 12 as shown, for example, in FIGURE 3. Roller 44 is journaled on shaft 48 affixed to a depending support 50 secured to unit 1 by suitable means such as mounting bolt 52. Roller 44 may be freely rotating or alternatively may be driven by appropriate means such as gears or pulleys operatively connected to the roller that rotation of pinion 42 will cause the pinion or shaft 54 protruding therefrom to cause driving rotation of roller 44.

Referring again to FIGURES 1 and 2, it may be seen that driving means for movement of unit 1 relative to workpiece 2 further include pressure means in the form of cylinder 56 which may be responsive to hydraulic or pneumatic pressure to cause rotation of drive pinion 38 through a suitable overriding or backstop clutch 58. Clutch 58 is of the type which transmits rotating motion to an output shaft in one direction only, an example of which is the item sold commercially by the Morse Chain Division of Borg-Warner, 5071 Telegraph Road, Los Angeles, California. Cylinder 56 is pivotally mounted at its upper end to frame 10 by a pin 60 as shown in FIGURE 2. Thus, cylinder 56 is linearly immovable with respect to mobile unit 1, while an operating piston (not shown) contained within cylinder 56 and connected to shaft 62 is movable in a direction coinciding with the cylinder longitudinal axis whereby force applied to shaft 62 may cause rotation of pinion 38 through clutch 58. Driving connection between shaft 62 and clutch 58 may be seen from FIGURE 2 to include a tang 64 secured at the distal end of shaft 62 and pivoted by means of pin 66 to clevis 68 affixed to a movable outer portion of clutch 58. Cylinder 56 may be single acting whereby fluid pressure may cause downward movement of shaft 62 during the work stroke, after which spring force from a coil spring 168 acting upon the operating piston within cylinder 56 may return the piston and shaft 62 to the uppermost limit of its travel when cylinder 56 is not pressurized. It will be understood by those skilled in the art that overriding clutch 58 operates to cause rotation of driving pinion 38 in one direction only, such as during generally downward movement of shaft 62, after which the clutch slips during upward or return movement of shaft 62 when cylinder 56 is no longer pressurized so that pinion 38 fails to rotate during the upward or return stroke of shaft 62.

The application of heat and pressure such as required to accomplish resistance welding along the two generally parallel joints formed by abutting edges of face sheets 3 and closure strip 11 as shown by FIGURE 8 is accomplished by electrodes 70 and 72 shown, for example, in FIGURE 4. Upper electrode 70 is mounted on unit 1 in a manner permitting lateral movement thereof whereby pressure may be applied by electrode 70 to filler strips 15 and 17, for example, and thereafter may be aligned over filler strips 13 and 19 to apply welding force and heat thereto as well as cooling and forging the joint after welding in each case. Lower electrode 72 in the form of a bar extending under both of the joints to be welded requires no such movement, and is stationary with respect to mobile unit 1. Lower electrode 72 is formed on an end portion 74 of a depending support 76 connected to frame 10 of mobile unit 1 by appropriate means such as bolt 78, for example. Support 76 is of the cantilever type, being fixed at one end by bolts 78 to relatively stationary structure 10 and free at end portion 74.

Transverse movement of upper electrode 70 between the two generally parallel joints to be welded is accomplished by means of a pivot pin 80 shown in FIGURE 4, for example, at the lower end of which is affixed a movable support block 82 which moves in an arc about a center located on the longitudinal axis of pin 80 during rotational movement of the stated pin. Pin 80 is rotatably journaled within a low-friction bearing sleeve 84 secured within stationary mounting means 86 forming part of body 10. Downward force to apply welding pressure to upper electrode 70 is applied by force means in the form of cylinder 88 which may be hydraulic, pneumatic or a combination of both. Cylinder 88 contains a work piston 182 (see FIGURE 11) connected to a work shaft 90 which is vertically movable a short distance relative to mobile unit 1 and which is connected to movable support block 82 whereby rotation of block 82 causing movement of upper electrode 70 also results in the application of force to shaft 90 causing corresponding rotational movement of the shaft and of cylinder 88 in which it is operatively engaged. Force to cause rotational movement of cylinder 88 in an arc about a center located on the longitudinal axis of pin 80 is also applied through a bearing block 92 to which the upper end of cylinder 88 is affixed by suitable means such as bolts 94 and which is keyed to pin 80 by a spline or slot 96 formed in pin 80 and containing a key 98 operatively connected to transmit rotating force from pin 80 into bearing block 92.

Force to cause rotation of pin 80 and elements connected thereto as described above originates within force means in the form of cylinder 102 which is pivotally mounted at one end thereof to plate member 100 by means of pivot connection 104 comprising tang 106 connected to the cylinder and clevis 108 welded or otherwise affixed to plate member 100. As seen from FIGURE 5, pivot connection 104 further includes a spherical member 110 secured between the confronting flanges of clevis 108 by bolt 112, while tang 106 is provided with an aperture having a surface of oppositely corresponding shape with respect to spherical member 110 whereby a bearing connection between the stated aperture and spherical member is established to permit universal pivoting movement of tang 106 about a center coinciding with the center of spherical member 110. From the foregoing description it will be understood that cylinder 102 is pivoted for universal movement with respect to platform member 100 but is otherwise stationary. Cylinder 102 contains a work piston 174 (see FIGURE 11) linearly movable in opposite directions on a line coinciding with the longitudinal axis of cylinder 102. The stated piston is operatively connected to a piston rod 114 adapted to transmit movement from piston 174 to a link 116 through a pivoting connection 118 shown, for example, in FIGURE 2. Pivoting connection 118 may be formed generally the same as pivot connection 104 described above in order to permit universal pivoting movement between rod 114 and link 116. Link 116 is securely affixed to pin 80 at the upper end thereof by suitable means such as a screw 120 which may be used to hold link 116 within a slot 122 at the upper end of pin 80 as shown whereby force applied by piston rod 114 to link 116 through pivot connection 118 may cause rotational movement of link 116 about a center situated on the longitudinal axis of pin 80, resulting in similar rotational movement of the stated pin.

Limit means for controlling the amount of rotational movement described above are provided in the form of two adjustable stops generally designated by reference numerals 124 and 126 in FIGURE 2, including adjusting screws 128 and 130 operatively related to a bearing portion 132 at the distal end of arm 134 formed on link 116 at the end thereof opposite from pivot connection 118.

Referring to FIGURES 3, 4 and 14, it may be seen that depending support 76 upon which lower electrode 72 is mounted may be provided with a plurality of tunnels or apertures through which closure strip 11 and filler strips 13, 15, 17 and 19 are supplied to the welding area between electrodes 70 and 72. Thus, strip 11 may feed through aperture 218, while strips 13, 15, 19 and 17 may feed through apertures 220, 222, 224 and 226, respectively. As also shown in FIGURE 4, force means are provided on mobile unit 1 for applying downward force on filler strip 11 and the scab strips welded therewith to upper surface 3 in order to align the same in positive and continuous contact just ahead of the location where welding occurs between electrodes 70 and 72. The stated force means includes a roller 138 mounted for rotation under a vertically movable plug member 140 through which downward force is applied by compression spring 142 within which a cylindrical internal spring guide 144 is situated. An external spring guide is also provided in the form of sleeve 146 which also contains and guides the movement of plug member 140 by reason of its bearing contact therewith as shown by FIGURE 4.

While mobile unit 1 may be adapted for use with either hydraulic or pneumatic systems and may incorporate various electrical devices for automatic sequential operation in the manner of mobile welding devices generally, an illustrative embodiment of a pneumatic system is shown schematically in FIGURE 11 for the sake of illustration. Referring to the stated figure, it may be seen that a source of variable pneumatic pressure is provided at 150 and is connected through a conduit or pressure line 152 to a two-position valve 154. In the position shown by FIGURE 11, valve 154 permits the pressure from source 150 to be applied to a conduit 156 while another conduit 158 is connected through the valve to a vent line 160 open to atmosphere. Line 156 divides to form two additional conduits 162 and 164. Line 162 is connected to cylinder 56 whereby pressure from source 150 may be communicated to the cylinder in an amount sufficient to cause movement of a work piston 166 towards the left as shown in FIGURE 11 against the force of a compression spring 168. Line 164 may be further seen to divide into lines 170 and 172 leading to cylinders 102 and 88, respectively.

Line 170 communicates with one end of cylinder 102 whereby pressure within line 170 may be applied to one side of piston 174 within the cylinder, causing movement of the piston in one direction for a distance limited by contact of bearing portion 132 with adjusting screw 128 in a manner discussed above. Line 172 connects with a separate valve 178 through which line 172 may communicate with line 180 leading to cylinder 88. Cylinder 88 contains a work piston 182 against which force is continually applied in one direction by a compression spring 184 also contained within cylinder 88. Line 158 divides into two lines 188 and 192 whereby pressure in line 158 is communicated both to cylinder 102 and through check valve 190 to cylinder 88, respectively.

FIGURE 6 shows the position of upper electrode 70 relative to lower electrode 72 for welding in a first location close to the bottom edge of electrode 72 as viewed in the figure. It will be understood that rotation of pin 80 clockwise about the axial center thereof to position electrode 70 directly above the location shown by FIGURE 6 may be accomplished for welding in a second location close to the top edge of electrode 72. The amount of rotation of pin 80 in either direction is limited by contact of bearing portion 132 with adjusting screws 128 and 130 as described above in connection with FIGURE 2.

Rotation of upper electrode 70 about the axial center of pin 80 to alter the welding position thereof as described above in connection with FIGURE 6 may also be seen from FIGURE 7 by a comparison of the positions of electrode 70 shown in solid and in dashed lines. Moreover, cooling provisions for cooling of electrode 70 may be seen from FIGURES 6 and 7 to include an external cooling water line 214 connected to support block 82 and communicating to the hollow electrode by passage means 216. Additional passage means for exit water flow from electrode 70 may further be provided in support block 82 for continuous water flow through electrode 70 if desired.

A modification of the structure shown in FIGURES 1–3, for example, is illustrated by FIGURE 9 wherein upper electrode 70 and force cylinder 88 associated therewith are replaced by two separate cylinders 194 and 196 connected to two wheel electrodes 198 and 200, respectively. Wheel electrodes 198 and 200 are adapted to perform indirect welding by welding current which flows from one electrode through the workpiece into the other electrode. Forging may be accomplished by downward force applied to each of the wheel electrodes after welding is performed intermittently by the same. Lower bearing element 73 is mounted on a support 76 in the manner of electrode 72 discussed above in connection with FIGURES 1–3, for example, and functions to apply reaction force during welding and forging by electrodes 198 and 200.

A further modification of the upper electrode arrangement shown by FIGURES 1–3, for example, is shown in FIGURE 10 wherein it may be seen that upper electrode 70 and pressure cylinder 88 have been replaced by two separate electrodes 202 and 204 to which separate pressure cylinders 206 and 208 are operatively connected through force transmission means 210 and 212, respectively. The structure thus shown by FIGURE 10 may perform resistance welding by the application of compressive force on a workpiece portion situated between upper electrodes 202 or 204 and lower electrode 72 by a suitable sequence such as alternate actuation of the two stated upper electrodes for welding along two separate paths, instead of using one upper electrode 70 movably mounted between the two stated paths as described herein above in connection with the preferred embodiment shown by FIGURES 1–3, for example.

*Operation*

Although the apparatus disclosed herein may be used for automatic welding of a variety of diverse materials, workpieces, and for different purposes, its operation will not in any case differ materially from the description set forth below for the sake of illustration. The first step in operating the apparatus requires that supporting elements 12 and 14 be positioned on either side of the welding path and secured to the surface of the workpiece to be welded by means of vacuum cups or magnets 32. Thereafter, mobile unit 1 is positioned on supporting elements 12 and 14 and in operative relationship therewith by engagement of guide rollers 44 contacting surfaces 46, and driving pinions 38 operatively engaging racks 40. In the problem situation discussed above and shown in FIGURE 3 for the sake of illustration, the work to be welded consists of two substantially identical panels 2 and 2', the confronting edges of which have been previously prepared for joinder by the welding apparatus disclosed herein. Accordingly, mobile unit 1 is positioned and aligned so that lower electrode 72 is centered below upper surfaces 3 of the two stated panels and is situated between the upper and lower surfaces 3 and 4, respectively. Closure strip 11 is positioned within tunnel 218, while filler strips 13, 15, 19 and 17 are positioned within apertures 220, 222, 224 and 226, respectively. Closure strip 11 and filler strips 13, 15, 17 and 19 may be tack welded at the ends thereof adjacent to the edges of face sheets 3 on either side of strip 11 as shown, for example, by FIGURE 1, after which operation of mobile unit 1 may be initiated to continue the welding operation.

Operation of mobile unit 1 may be started by rotating valve 154 to the position shown by FIGURE 11 whereby pressure is communicated from source 150 through lines 156 to lines 162 and 164. The amount of pressure from variable pressure source 150 need not be great at this point in operation of the apparatus. Pressure in line 162 immediately results in the application of force to work piston 166 moving the same towards the left as shown in FIGURE 11, thereby causing corresponding movement of rod 62, resulting in rotation of drive pinion 38 until a mechanical stop is reached, such as the bottoming of piston 166 at its limit of travel.

Pressurization of line 164 results in flow into lines 170 and 172 whereby work piston 174 within cylinder 102 is moved upwardly in the view shown by FIGURE 11 until its maximum limit of movement is reached as determined by contact of bearing portion 132 with adjustable screw 130. Pressure in line 172 is communicated to valve 178 through check valve 176.

In the stated pressure condition, it will be understood from the structure shown in FIGURE 11 and related to that discussed above in connection with FIGURES 1 through 4, for example, that pressurization of cylinder 56 will cause linear movement of mobile unit 1 an incremental distance along supporting numbers 12 and 14 equivalent to the amount of rotation of pinion 38, after which mobile unit 1 will remain stationary until further rotation of the driving pinion occurs following welding of closure strip 11 and filler strips 13, 15, 17 and 19 at the station coinciding with the position of mobile unit 1. Simultaneous with the pressurization of cylinder 56 as described above, movement of piston 174 within cylinder 102 to one limit of its travel as stated above causes rotation of pin 80.

After pressurization of cylinders 56 and 102 is complete, valve 178 may be rotated to communicate line 172 with line 180, thereby admitting pressure into cylinder 88 and causing force to be applied to piston 182 therewithin. Application of force to piston 182 in the stated manner acts in opposition to spring force from compression spring 184 and causes movement of electrode 70 in the same direction as piston 182 whereby force may be applied from the electrode to the workpiece being welded. The pressure at source 150 may be varied to produce the desired amount of downward force at electrode 70 for welding and forging in the desired sequence of timing as discussed more particularly hereinabove.

Upon the completion of welding and forging in the area contacted by electrode 70, valve 178 may be rotated to the position shown by FIGURE 11 wherein pressure within cylinder 88 is vented through line 180 into line 186 and thence to atmosphere, causing piston 182 to move toward the left as shown in FIGURE 11 under the influence of spring 184. Thereafter, valve 154 may be rotated 90 degrees from the position in FIGURE 11, whereby the pressure in cylinders 102 and 56 is communicated to the atmosphere through lines 170, 164, 162, 156, and 160. The new position of valve 154 in consequence of the rotation mentioned above also results in communication of pressure from source 150 through line 152 into line 158 which communicates through line 188 with the side of cylinder 102 opposite from the cylinder connection with line 170. Accordingly, pressure may be applied to piston 174 on the uppermost side thereof as shown by FIGURE 11 in an amount determined by variable pressure source 150, causing movement of piston 174 toward the opposite extreme permitted by contact of bearing member 132 with adjusting screw 128. The stated movement of piston 174 causes rotation of pin 80 which positions upper electrode 70 in a new welding location laterally displaced from the location identified with movement of piston 174 to the position limited by contact of bearing member 132 with adjusting screw 130. Pressure within line 158 is also communicted through a check valve 190 to line 192 which in turn communicates with valve 178 as shown. Accordingly, after pressurization of cylinder 102 is completed in the manner stated above, valve 178 may be rotated from the position shown in FIGURE 11, to result in communication of line 192 with line 180, whereupon cylinder 88 will become pressurized and force will be applied by electrode 70 to the workpiece to cause welding thereof in a manner generally similar to that described in connection with the initial position of valve 154 as set forth above. Upon the completion of welding by electrode 70, valve 178 may again be positioned as shown on FIGURE 11 to vent pressure within cylinder 88 to atmosphere through line 186, after which valve 154 may be again rotated to the position shown by FIGURE 11 causing the application of pressure to cylinders 56 and 102 through lines 162 and 164, respectively. Pressure within cylinder 56 applies force to piston 156 causing rotation of pinion 38 in the manner described above, whereby mobile unit 1 is again moved linearly along supporting elements 12 and 14 a distance determined by the amount of rotation of pinion 38. After the new welding station is established, and electrode 70 is positioned by rotation of pin 80 as determined by movement of piston 174 within cylinder 102, valve 178 may again be rotated to communicate pressure from line 176 into cylinder 88 whereby force is applied by upper electrode 70 to the workpiece for welding thereof.

With regard to the structure shown by FIGURE 9, it will be understood by those skilled in the art that welding is accomplished generally as set forth above in connection with the apparatus shown by FIGURES 1–8, inclusive, with the exception that wheel type electrodes 198 and 200 permit welding of abutting members 11 and 3 together with filler strips 13, 15, 17 and 19 simultaneously along two generally parallel welding paths. During the application of heat to the materials to be welded, compressive force is applied to the materials forming the welded joint in each case by means of separate cylinders 194 and 196 which may be constructed and operated generally in the manner disclosed above for cylinder 88.

In regard to the modification shown by FIGURE 10, compressive force to accomplish resistance welding of a workpiece portion situated under upper electrodes 202 and 204 is applied by downward force originating in cylinders 206 and 208 which function in a manner generally similiar to that discussed above in connection with cylinder 88. Thus, for example, cylinder 206 may be actuated to apply downward force to electrode 202 according to a welding schedule coordinating such force with the application of welding heat through electrodes 202 and 72. After a weld has been completed by the stated action of electrodes 202 and 72, followed by forging as discussed above in connection with FIGURES 12 and 13, for example, cylinder 206 may be vented or otherwise actuated to raise electrode 202, after which cylinder 208 may be pressurized to apply downward force to electrode 204 in cooperation with the programmed application of welding heat by means of electrodes 204 and 72. Upon the completion of a weld by both electrodes 202 and 204 operated alternatively in the manner stated, mobile unit 1 upon which both electrodes are mounted may be moved in the direction desired for the welding paths produced by actuation of the electrodes.

In connection with the several structural modifications embodying the inventive principles disclosed herein, various controls or programming devices for coordinating or controlling actuation of cylinders to apply force to a workpiece or to move unit 1 will occur to those skilled in the art, and the scope of the teachings herein is not limited by the selection of any particular controls or regulating devices. For example, microswitches could advantageously be secured to frame 10 for actuation by clutch 56 or block 82 whereby movement of the stated component rotationally or vertically, as the case may be, would cause actuation of one cylinder or the other.

From the description set forth above, it may be seen that the invention disclosed herein provides an improved resistance welded connection between metallic sheets, strips, flanges or the like, and makes possible an improved structural joint between lightweight sandwich type panels and workpieces of many other types involving thin walled construction. The teachings set forth herein are particularly applicable to workpiece materials exhibiting a severe sensitivity to minute nicks or scratches, such as precipitation hardened steels. The invention further includes novel apparatus and method for achieving the stated joint in panels of sandwich type construction.

While the particular details set forth above and in the drawings are fully capable of attaining the objects and providing the advantages herein stated, the structure and procedure thus disclosed are merely illustrative and could be varied or modified to produce the same results without departing from the scope of the inventive concept as defined in the appended claims.

We claim:

1. In welding apparatus: welding means for effecting a resistance weld between two relatively thin members, said welding means being adapted to perform resistance welding progressively along a welding path to join said two members, carriage means for mounting said welding means movably with respect to said members, and support means for supporting said carriage means entirely on said members on one side thereof.

2. The structure set forth in claim 1 above wherein said welding means includes a plurality of electrodes.

3. The structure set forth in claim 1 above in which said welding means includes a first electrode mounted on said carriage means and stationary with respect thereto, and a second electrode mounted on said carriage means movably with respect thereto toward and away from said first electrode whereby a portion of said two members in the weld area may be compressed between said first and second electrodes.

4. The structure set forth in claim 3 above in which said first electrode is secured by cantilevered support means on said carriage means.

5. The structure set forth in claim 4 above, including in addition thereto, force means for applying force to said second electrode whereby pressure is applied to the weld joint between said first and second electrodes.

6. In welding apparatus: welding means for effecting a resistance weld between two relatively thin panel members, said welding means being adapted to perform resistance welding progressively along a welding path to join said two members, carriage means for mounting said welding means movably with respect to said members, support means for supporting said carriage means entirely on said members on one side thereof, and means for supplying a strip of metal continuously to the area of said weld in predetermined overlapping relationship with both said members whereby said strip is fused to both said members along said welding path.

7. The structure set forth in claim 6 above in which said welding means includes means for simultaneously applying heat and compressive force to said strip and said two members in an amount at least sufficient to cause fusion of materials in said two members and said strip in a weld zone penetrating said strip from 10 to 30 percent of the total thicknes of said strip.

8. In welding apparatus: welding means for effecting a resistance weld between two spaced apart metal sheets, said welding means being adapted to perform resistance welding progressively along two welding paths to join each of said two sheets to the abutting edges of a filler strip adapted to completely fill the gap between said two spaced apart metal sheets, carriage means for mounting said welding means movably with respect to said sheets and said filler strip, and support means for supporting said carriage means entirely on said sheets.

9. The structure set forth in claim 8 above, in which said welding means includes a first electrode secured on said carriage means and stationary with respect thereto, a second electrode on said carriage means mounted movably with respect thereto toward and away from said first electrode whereby compressive force may be applied to the welded joint between said first and second electrodes, said second electrode also being mounted on said carriage means movably with respect thereto laterally between said welding paths, and means for moving said second electrode between said welding paths.

10. The structure set forth in claim 9 above including in addition thereto, means for supply said filler strip continuously to the area of said welds in predetermined welding relationship with both said sheets whereby said strip is fused to both said sheets along the welding paths.

11. The structure set forth in claim 10 above including in addition thereto, holding means for holding said strip in welding relationship during the application of heat and pressure by said first and second electrodes along said welding paths.

12. In welding apparatus: welding means for effecting a resistance weld between two relatively thin members, said welding means being adapted to perform resistance welding progressively along a welding path to join said two members, carriage means for mounting said welding means movably with respect to said members, support means for supporting said carriage means entirely on said members, and drive means for moving said carriage means on said support means whereby said welding means moves progressively along said welding path.

13. The structure set forth in claim 12 above wherein said drive means includes means for automatically moving said carriage means sequentially in a succession of individual linear movements having a constant predetermined length whereby welding by said welding means will occur at a plurality of successive welding locations defining said welding path.

14. The structure set forth in claim 13 above in which said drive means includes a cylinder mounted on said carriage means, a work piston within said cylinder, said work piston operatively connected to a rotating element whereby movement of said piston causes rotation of said rotating element to cause movement of said carriage means, and pressure means for applying pressure to cause movement of said piston.

15. In welding apparatus: welding means for effecting a resistance weld between two metal sheets, said welding means being adapted to perform resistance welding progressively along a welding path to join said two metal sheets, carriage means for mounting said welding means movably with respect to said sheets, said welding means including a first electrode mounted on said carriage means and stationary with respect thereto, a second electrode mounted on said carriage means and movable with respect thereto toward and away from said first electrode, force means for applying force to said second electrode whereby compressive force may be applied to the work to be welded between said electrodes, support means for supporting said carriage means entirely on said sheets, and drive means for automatically moving said carriage means in a succession of individual movements along a linear path.

16. In welding apparatus: welding means for effecting a resistance weld between two metal sheets, said welding means being adapted to perform resistance welding progressively along a welding path to join said two sheets, carriage means for mounting said welding means movably with respect to said sheets, and support means for supporting said carriage means entirely on one side of said sheets, said support means including a track removably mounted on one of said two sheets.

17. In welding apparatus: welding means for effecting a resistance weld between two relatively thin members, said welding means being adapted to perform resistance welding progressively along a welded path to join said two members along their abutting edges, carriage means for mounting said welding means movably with respect to said members, support means for supporting said carriage means entirely on one side of said members, drive means for moving said carriage on said support means in a succession of individual movements of constant predetermined lengths whereby welding accomplished by said welding means after each said movement produces a succession of welds collectively defining said path, and means for supplying a strip of metal continuously to the area of said welds in predetermined welding relationship with both said members whereby said strip is fused to both said members along the said welding path.

18. The structure set forth in claim 17 above wherein said welding means includes a first electrode secured by cantilevered support means on said carriage means and stationary with respect thereto, and said means for supplying a strip of metal comprises a tunnel in said cantilevered support through which said strip passes.

19. In welding apparatus: welding means for effecting a resistance welded joint between two spaced apart edges of flange-like form, said welding means being adapted to perform resistance welding progressively along two separate parallel welding paths to join each of said two edges to one side of a first strip adapted to fill the gap between said two spaced apart edges, carriage means for mounting said welding means movably with respect to said edges, support means for supporting said carriage means entirely on one side of said edges, means for supplying said first strip continuously to the area of said welding in predetermined welding relationship with both said edges whereby said first strip is fused to both said edges along said welding paths, said welding means including a first electrode secured by cantilevered support means of said carriage means and stationary with respect thereto, a second electrode mounted on said carriage means movably with respect thereto toward and away from said first electrode, said second electrode also mounted on said carriage means movably with respect thereto laterally between said two welding paths, and means for moving said second electrode between said two welding paths.

20. The structure set forth in claim 19 above wherein said means for supplying said first strip includes aperture means in said cantilevered support through which said first strip passes, and including in addition thereto, means for supplying two metallic strips continuously to the area of said welds in predetermined overlapping relationship with each of the joints formed on either side of said first strip whereby one of said metallic strips is fused to said first strip and one of said edges.

21. The apparatus set forth in claim 20 above including in addition thereto, means for supplying a second pair of metallic strips continuously to the area of said welds in predetermined overlapping relationship with said joints formed on either side of said first strip and in contact with the surface of said first strip opposite from the surface thereof contacted by said first pair of metallic strips whereby each of said second pair of metallic strips is fused to said first strip and one of said two spaced apart edges along one of said welding paths.

22. In a mobile device for welding progressively along a first distal edge of flange-like structure on a workpiece to weld said first edge to an abutting second edge of flange-like structure, a first electrode, cantilevered support means for supporting said first electrode, a second electrode movable toward and away from said first electrode, carriage means for supporting said cantilevered support means and said second electrode, force means on said carriage means for applying force to said second electrode in the direction toward said first electrode whereby pressure is exerted on said first and second edges situated between said first and second electrodes for resistance welding of said edges, and support means for supporting said carriage means entirely on said workpiece.

23. The structure set forth in claim 22 above including in addition thereto, drive means for moving said carriage means on said support means whereby said first and second electrodes are automatically positioned in a plurality of successive welding locations along said welding path.

24. In a mobile device for welding progressively along a first distal edge of flange-like structure on a workpiece to weld said first edge to an abutting second edge of flange-like structure, a first electrode secured by cantilevered support means on said mobile device and stationary with respect thereto and movable with said mobile device along a welding path, a second electrode on said mobile device movable with respect thereto toward and away from said first electrode, force means for applying force to said second electrode in the direction toward said first electrode whereby pressure is exerted on said first and second edges situated between said first and second electrodes for resistance welding of said edges, means for supplying a strip of metal continuously to the area of said weld in predetermined welding relationship with said workpiece whereby said strip is fused to said workpiece along said welding path, said means for supplying said strip comprising a tunnel in said cantilevered support.

25. In a mobile device for welding progressively along a first distal edge of flange-like structure on a workpiece to weld said first edge to an abutting second edge of flange-like structure, a first electrode secured by cantilevered support means on said mobile device and stationary with respect thereto and movable with said mobile device along a welding path, a second electrode on said mobile device movable with respect thereto toward and away from said first electrode, force means for applying force to said second electrode in the direction toward said first electrode whereby pressure is exerted on said first and second edges situated between said first and second electrodes for resistance welding of said edges, means for supplying a strip of metal continuously to the area of said weld in predetermined welding relationship with said workpiece whereby said strip is fused to said workpiece along said welding path, and holding means for holding said strip in welding relationship with said two edges during the application of heat and pressure to fuse said strip and said edges.

26. A mobile device for welding progressively on a workpiece of sheet form, said mobile device comprising: a first electrode secured by cantilevered support means, a second electrode movable toward and away from said first electrode and also movable laterally between two welding paths, force means for applying force to said second electrode in the direction toward said first electrode whereby pressure is exerted on a portion of said workpiece situated between said first and second electrodes for resistance welding of said workpiece portion in a relatively small area, and positioning means for moving said second electrode laterally for alternately and progressively welding said small areas along each of said welding paths.

27. In a mobile device for welding progressively on a workpiece of sheet form: a first electrode secured by cantilevered support means on said mobile device and stationary with respect thereto, a second electrode on said mobile device movable with respect thereto toward and away from said first electrode and also movable with respect to said mobile device laterally between two welding paths, force means for applying force to said second electrode in the direction toward said first electrode whereby pressure is exerted on a portion of said workpiece situated between said first and second electrodes for resistance welding of said workpiece portion in a relatively small area, positioning means for moving said second electrode laterally for welding said workpiece along each of said welding paths, and means for supplying a strip of metal continuously to said area in predetermined relationship with said portion whereby said strip is fused to the material forming the welded joint along each of said paths.

28. The structure set forth in claim 27 above wherein said means for supplying said strip includes a tunnel through said cantilevered support through which said strip passes.

29. The structure set forth in claim 27 above including an addition thereto, holding means for holding said strip in welding relationship between said first and second electrodes.

30. In a mobile device for welding progressively on a workpiece of sheet form: a first electrode secured by cantilevered support means on said mobile device and stationary with respect thereto, a second electrode on said mobile device movable with respect thereto toward and away from said first electrode and also movable with respect to said mobile device laterally between two welding paths, force means for applying force to said second electrode in the direction toward said first electrode whereby pressure is exerted on a portion of said workpiece situated between said first and second electrodes for resistance welding of said workpiece portion in a relatively small area, positioning means for moving said second electrode laterally for welding said workpiece along each of said welding paths, said positioning means including limit means for independent adjustment of the limits of said lateral movement of said second electrode in either direction whereby the location of said two welding paths may be adjustably varied.

31. In a mobile device for welding progressively on a workpiece of sheet form: a first electrode secured by cantilevered support means on said mobile device and stationary with respect thereto, a second electrode on said mobile device movable with respect thereto toward and away from said first electrode and also movable with respect to said mobile device laterally between two welding paths, force means for applying force to said second electrode in the direction toward said first electrode whereby pressure is exerted on a portion of said workpiece situated between said first and second electrode for resistance welding of said workpiece portion in a relatively small area, positioning means for moving said second electrode laterally for welding said workpiece along each of said welding paths, support means for supporting said mobile device movably with respect to said workpiece, drive means for moving said mobile device by increments of substantially constant length on said support means whereby welding by said first and second electrodes at the location where said mobile device stops after each increment of movement produces a succession of overlapping welds forming a substantially continuous line means for cooling said area upon completion of welding in said portion, and means for forging said area after said cooling.

32. The structure set forth in claim 31 above wherein said drive means includes a pneumatic cylinder mounted on said mobile device and a movable piston within said cylinder operatively connected to cause said mobile device movement in response to one direction of piston movement.

33. In welding apparatus: welding means for effecting a plurality of resistance spot welds between relatively thin-walled workpiece portions, carriage means for mounting said welding means movably with respect to said structure, said welding means including a first electrode mounted on said carriage by a cantilevered support and stationary with respect thereto, second and third electrodes mounted on said carriage means movably with respect thereto both toward and away from said first electrode whereby workpiece material situated between said first and second electrodes or between said first and third electrodes may be welded during application of force resulting from movement of said second electrode toward first electrode or movement of said third electrode toward said first electrode, and during simultaneous application of welding current through said electrodes during application of said force to produce a pair of spaced apart resistance spot welded joints.

34. The structure set forth in claim 33 above including in addition thereto, means for supplying a relatively thin strip to the area of said welds in predetermined welding relationship with both said welded joints whereby said strip is fused along both sides thereof by the action of said second electrode on one side of said strip and of said third electrode on the other side of said strip.

35. The structure set forth in claim 34 above in which said means for supplying said strip includes a tunnel through said cantilevered support through which said strip passes during operation of said welding device.

36. The structure set forth in claim 35 above including in addition thereto, drive means for moving said carriage means relative to said workpiece in a succession of incremental movements whereby actuation of said second and third electrodes alternately between each of the said incremental movements will result in a succession of spot welds forming two generally parallel paths.

37. The structure recited in claim 35 above including in addition thereto, holding means for holding said strip in predetermined welding relationship during welding by said first, second and third electrodes.

38. In a mobile device for welding progressively along two generally parallel paths on a relatively thin workpiece portion: a bearing surface secured by cantilevered support means on said mobile device and stationary with respect thereto, a first electrode of arcuate form rotationally mounted on said mobile device and movable linearly with respect to said mobile device toward and away from said bearing surface, a second electrode of arcuate form rotationally mounted on said mobile device movably with respect thereto toward and away from said bearing surface, force means for applying force to said second and third electrodes simultaneously in the direction toward said bearing surface whereby pressure is exerted on a portion of said workpiece situated between said first and second electrodes and said bearing surface for resistance welding of said workpiece portion, and support means removably mounted on said workpiece surface for supporting said mobile device movably with respect to said workpiece.

39. In a mobile device for welding progressively along two generally parallel welding paths on a relatively thin workpiece portion: a bearing surface secured by cantilevered support means on said mobile device and stationary with respect thereto, a first electrode of arcuate form rotationally mounted on said mobile device and movable linearly with respect to said mobile device toward and away from said bearing surface, a second electrode of arcuate form rotationally mounted on said mobile device movably with respect thereto toward and away from said bearing surface, force means for applying force to said second and third electrodes simultaneously in the direction toward said bearing surface whereby pressure is exerted on a portion of said workpiece situated between said first and second electrodes and said bearing surface for resistance welding of said workpiece portion, and means for supplying a metallic strip continuously to the area of said weld in predetermined welding relationship with the other materials fused to form said welded joints whereby said strip is fused along either side thereof by said first and second electrodes, respectively, functionally cooperating with said bearing surface.

40. The structure set forth in claim 39 above wherein said means for supplying said strip includes a tunnel through said cantilevered support through which said strip passes during the welding operation.

41. The structure set forth in claim 40 above including in addition thereto, drive means for moving said moble unit relative to said workpiece whereby said first and second electrodes accomplish welding progressively thereon.

42. The structure set forth in claim 41 above including in addition thereto, holding means for holding said strip in predetermined welding relationship during welding by said first and second electrodes.

43. In apparatus for welding connections between face sheets in lightweight panel workpiece having a relatively low density core sandwiched between two relatively dense upper and lower face sheets, said apparatus being adapted for welding a closure strip between two confronting spaced-apart edges of face sheets on one side of two such workpieces after the other face sheets on said two workpieces have been joined: welding means for resistance welding along two generally parallel welding paths defined by the confronting spaced-apart edges of said two face sheets, said welding means comprising means for applying heat and pressure to effect a resistance weld joint between each of said confronting edges and the abutting edges of a closure strip situated between said two confronting spaced-apart edges whereby each of the opposite marginal sides of said closure strip is fused to one of said two confronting spaced-apart edges, said means for applying heat and pressure including first electrode means for contacting one surface of said face sheet and said closure strip, and second electrode means movable relative to said first electrode means for contacting another surface of said face sheets and said closure strip opposite from said one surface, and support means for supporting said first electrode means stationarily relative to said second electrode means, proximate said low density core and between said upper and lower face sheets.

44. In apparatus for welding connections between face sheets in lightweight panel workpieces having a relatively low density core sandwiched between two relatively dense upper and lower face sheets, said apparatus being adapted for welding a closure strip between two confronting spaced-apart edges of face sheets on one side of two such workpieces after the other face sheets on said two workpieces have been joined: welding means for resistance welding along two generally parallel welding paths defined by the confronting spaced-apart edges of said two face sheets, said welding means including a first electrode secured by cantilevered support means on a carriage movable relative to said workpieces and said first electrode is stationary with respect to said carriage, and a second electrode on said carriage movably mounted with respect thereto toward and away from said first electrode whereby movement of said second electrode toward said first electrode causes application of force to the workpiece portions between said first and second electrodes as necessary for resistance welding of said workpiece during simultaneous application of welding current through said first and second electrodes, said second electrode also being mounted on said carriage laterally movable with respect thereto for movement of said second electrode from a position of alignment over a first weld location laterally to a second weld location whereby welding is accomplished in two separate locations while said carriage remains stationary with respect to said workpiece.

45. The structure set forth in claim 44 above including in addition thereto, drive means for moving said carriage by a succession of incremental movements relative to said workpiece whereby welding performed by said first and second electrodes at each of said first and second positions after each of said incremental movements results in a succession of welds defining said two welding paths.

46. The structure set forth in claim 45 above including in addition thereto, adjustable limit means for limiting the amount of lateral movement of said second electrode to vary the distance between said two welding paths.

References Cited by the Examiner

UNITED STATES PATENTS

| | | | |
|---|---|---|---|
| 1,052,490 | 2/1913 | Linden et al. | 219—82 |
| 1,654,037 | 12/1927 | Clark | 29—470.7 |
| 2,013,517 | 9/1935 | Kachel | 219—66 |
| 2,190,490 | 2/1940 | Sendzimir | 189—34 |
| 2,391,997 | 1/1946 | Noble | 189—36 |
| 2,583,575 | 1/1952 | Katz | 219—86 |
| 2,598,338 | 5/1952 | Arbogast | 29—470.7 |
| 2,780,716 | 2/1957 | Wasilisin et al. | 219—83 |
| 2,812,417 | 11/1957 | Busse et al. | 219—82 |
| 2,927,991 | 3/1960 | Schoelz | 219—87 |
| 3,111,575 | 11/1963 | Thompson et al. | 219—78 |

FOREIGN PATENTS 397,767 10/1924 Germany.

RICHARD M. WOOD, *Primary Examiner.*

JOHN F. CAMPBELL, JOSEPH V. TRUHE, *Examiners.*

C. I. SHERMAN, *Assistant Examiner.*